United States Patent
Borg

(10) Patent No.: US 8,009,325 B1
(45) Date of Patent: Aug. 30, 2011

(54) CONTROLLING BLACK LEVELS USING A THREE DIMENSIONAL INTERMEDIATE COLOR SPACE

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 601 days.

(21) Appl. No.: 12/129,424

(22) Filed: May 29, 2008

(51) Int. Cl.
*G06F 15/00* (2006.01)
*H04N 1/40* (2006.01)

(52) U.S. Cl. ......... 358/1.9; 358/523; 358/529; 358/518; 358/3.23; 345/604

(58) Field of Classification Search .................... 358/1.9, 358/1.13, 2.1, 3.01, 3.23, 3.26, 504, 515, 358/518, 523, 529; 382/162, 167; 345/604
See application file for complete search history.

(56) References Cited

U.S. PATENT DOCUMENTS

| | | | |
|---|---|---|---|
| 5,553,199 A * | 9/1996 | Spaulding et al. ............. | 358/1.9 |
| 6,084,689 A | 7/2000 | Mo | |
| 7,012,714 B2 * | 3/2006 | Higashikata et al. .......... | 358/1.9 |
| 7,019,868 B2 * | 3/2006 | Chang et al. .................... | 358/2.1 |
| 7,050,627 B2 | 5/2006 | Cuciurean-Zapan et al. | |
| 7,245,395 B2 * | 7/2007 | Couwenhoven et al. ...... | 358/1.9 |
| 7,259,893 B2 | 8/2007 | Falk et al. | |
| 7,269,297 B2 | 9/2007 | Loce et al. | |
| 7,298,527 B2 * | 11/2007 | Yabe .............................. | 358/1.9 |
| 7,411,696 B2 | 8/2008 | Maltz | |
| 7,586,643 B2 * | 9/2009 | Higashikata ................... | 358/1.9 |
| 7,729,014 B2 | 6/2010 | Falk et al. | |
| 7,751,085 B2 * | 7/2010 | Yabe .............................. | 358/1.9 |
| 2001/0035968 A1 * | 11/2001 | Higashikata et al. .......... | 358/1.9 |
| 2002/0113982 A1 * | 8/2002 | Chang et al. ................... | 358/1.9 |
| 2004/0109178 A1 * | 6/2004 | Couwenhoven et al. ...... | 358/1.9 |
| 2004/0179214 A1 * | 9/2004 | Yabe .............................. | 358/1.9 |
| 2005/0249408 A1 * | 11/2005 | Haikin ........................... | 382/167 |
| 2006/0033970 A1 * | 2/2006 | Haikin ........................... | 358/518 |
| 2006/0072131 A1 * | 4/2006 | Haikin et al. .................. | 358/1.9 |
| 2007/0153308 A1 | 7/2007 | Zemach et al. | |
| 2007/0268502 A1 * | 11/2007 | McCarthy et al. ............. | 358/1.9 |
| 2008/0080023 A1 | 4/2008 | Sato | |
| 2009/0103118 A1 | 4/2009 | Sawada | |
| 2009/0180127 A1 * | 7/2009 | Yabe .............................. | 358/1.9 |
| 2009/0185230 A1 * | 7/2009 | Mestha et al. ................. | 358/3.23 |
| 2009/0296108 A1 * | 12/2009 | Gil et al. ........................ | 358/1.9 |
| 2010/0157372 A1 * | 6/2010 | Qiao et al. ..................... | 358/3.01 |

OTHER PUBLICATIONS

Lars U. Borg, "Gray Component Replacement in Color Conversions" U.S. Appl. No. 12/040,526, filed Feb. 29, 2008.

* cited by examiner

*Primary Examiner* — Kimberly A Williams
(74) *Attorney, Agent, or Firm* — Fish & Richardson P.C.

(57) ABSTRACT

A method includes identifying multiple preferred color values in a destination color space. Each preferred color value is one of a set of colorimetrically equivalent color values. The destination color space has color values defined by a particular number of color components. The method further includes defining intermediate color values in an intermediate color space. The intermediate color values correspond to the multiple color values and the intermediate color space has a number of color components that is less than the particular number of color components of the destination color space. The method also includes identifying a known mapping from the destination color space to a source color space and using the intermediate color values and the known mapping to determine a conversion process for converting source color values to preferred color values.

25 Claims, 7 Drawing Sheets

CONTROLLING BLACK LEVELS USING A THREE DIMENSIONAL INTERMEDIATE COLOR SPACE

BACKGROUND

The present disclosure relates to the field of data processing, and more specifically to gray component replacement in color conversions.

Digital devices that create (e.g., scanners and digital cameras), display (e.g. CRT and LCD monitors), or print (e.g. ink jet and laser printers) colors typically define color data using color spaces. Generally, a color space is a combination of a color model and a gamut. A color model defines each color within the model using color components, such as, in the case of a Red, Green, Blue (RGB) color model, the levels of red, green, and blue light components needed to create each color, or in the case of a Cyan, Magenta, Yellow, and Key (CMYK) color model, the levels of cyan, magenta, yellow, and black ink needed to create each color. Some color models use primary components that are not primary colors, but are more abstract, such as the CIE XYZ color space. Levels of each component in the color models typically range from 0 to 100 percent of full intensity, which may be represented on a scale of 0 to 1. By varying the levels or intensities of the primary components, various colors in the color model may be created. However, as a practical matter a device is often limited in its ability to produce pure cyan, magenta, or yellow ink, which limits its range of colors or color gamut. A gamut is simply the range of colors that may be displayed on, rendered by, or captured by a particular device. Thus, each color in the color gamut can be represented as a tuple of the various components, such as (1,1,1) may represent white in an RGB color space where 1 is the maximum intensity for each of the color components.

Each device, depending on its limitations and definitions for pure primary colors, may have a different color gamut and thus color space. To facilitate rendering the same color in two different color spaces such that the color appears substantially the same in both color spaces, conversion methods may be performed. Converting from one device-dependent color space to another is often accomplished through an intermediary device-independent color space, which define colors in more absolute terms. Some examples of device-independent color spaces include the CIE XYZ, CIE L*a*b* (luminance, a, b), and CIE LCH (luminance, chroma, hue) color spaces. The relationship of a device's native color space with a device-independent color space typically is described by some combination of formulas, transfer functions, matrices, and look up tables. This relationship may be stored in an International Color Consortium (ICC) profile for the device. Methods to convert among the various device-independent color spaces are well known in the art.

The conversion from one color space to another may be done through a series of conventional processing steps. Some processing steps may be more computationally intensive than others. Some processing steps may require interpolation. Generally, there is a tradeoff between the number of steps, the complexity of each step, speed, and accuracy. In some applications, speed is of the essence and accuracy is sacrificed by reducing the number of steps and/or the complexity of the individual steps. Often to increase speed, a lookup table (LUT) is used either alone or with another simple processing step. A LUT maps points in one color space to corresponding points in another color space. For example, a color in a first RGB color space may have the color component values of (0, 45, 82) which, when converted to a second RGB color space, the color may have the color component values (5, 51, 76). This is because the ICC profile for each color space defines pure R, G, and B components differently. A LUT may be constructed by transforming a regularly spaced grid of color values in a first color space to a second color space using the most accurate processing steps, such as using the ICC profiles for example. Each grid point and its corresponding transform point in the second color space may be stored in the LUT. Converting colors that do not correspond to the grid points would involve interpolation, therefore, the more grid points the more accurate the conversion. However, increasing the number of the grid points complicates the LUT and may result in an increase in processing time.

SUMMARY

This specification describes technologies relating to gray component replacement in color conversions.

In general, one aspect of the subject matter described in this specification can be embodied in a method that includes identifying a plurality of preferred color values in a destination color space. Each preferred color value is one of a set of colorimetrically equivalent color values. The destination color space has color values defined by a particular number of color components. The method also includes defining intermediate color values in an intermediate color space. The intermediate color values correspond to the plurality of preferred color values and the intermediate color space has a number of color components that is less than the particular number of color components of the destination color space. The method further includes identifying a known mapping from the destination color space to a source color space and using the intermediate color values and the known mapping to determine a conversion process for converting source color values to preferred color values. Other embodiments of this aspect include corresponding systems, apparatus, and computer program products.

In general, another aspect of the subject matter described in this specification can be embodied in a method that includes receiving an input color value of a source color space for conversion to a destination color space. The destination color space has more color components than the source color space. The method also includes converting the input color value to a preferred color value in the destination color space using a conversion process for converting color values in the source color space to the destination color space. The conversion process is determined by identifying a plurality of preferred color values in the destination color space. Each of the plurality of preferred color values being one of a set of colorimetrically equivalent color values. The conversion process is further determined by defining intermediate color values in an intermediate color space. The intermediate color values correspond to the plurality of preferred color values and the intermediate color space has a number of color components that is equal to a number of color components of the source color space. The conversion process is also determined by identifying a known mapping from the destination color space to the source color space and using the intermediate color values and the known mapping to determine the conversion process for converting color values in the source color space to color values in the destination color space. Other embodiments of this aspect include corresponding systems, apparatus, and computer program products.

These and other embodiments can optionally include one or more of the following features. The methods and corresponding systems, apparatus, and computer program products can further include converting a source color value in a source color space to a preferred color value in the destination color space using the conversion process, the source color space having the same number of components as the intermediate color space. The destination color space can include cyan, magenta, yellow, and black color components, and the conversion process can include converting the source color value to a first destination color value, which has a black color component value that is not smoothed, using the intermediate color values and determining a preferred color value by applying a smoothing function to the black component value to obtain a new black component value. The conversion process can include converting the source color value to an intermediate color value and converting the intermediate color value to the preferred color value in the destination color space.

Using the intermediate color values and the known mapping to determine the conversion process can include using a lookup table having entries that are associated with the intermediate color values and the plurality of preferred color values in the destination color space. The plurality of corresponding preferred color values in the destination color space can include a plurality of color values associated with primary colors, secondary colors, a substantially darkest neutral color, a substantially brightest neutral color, black start colors, and black maximum colors. The destination color space can include color components that have a cyan component, a magenta component, a yellow component, and a black component. The conversion process can include a lookup table having entries associated with a plurality of color values in the source color space and a corresponding plurality of preferred color values in the destination color space. At least a portion of the plurality of preferred color values can be generated based on a gray component replacement profile. At least a portion of the plurality of preferred color values can be identified from an image file having a plurality of color values that share a gray component replacement profile.

The source color space can have three color components, the destination color space can have four color components, and the intermediate color space can have three color components. Before receiving the input color value, the input color value can be determined from a color value in a color space having more color components than the source color space.

Particular embodiments of the subject matter described in this specification can be implemented to realize one or more of the following advantages. Ink reduction can be maximized without loss of saturation or gamut, possibly up to 66% ink savings. Also, black dots may be eliminated in pure yellow printed areas, sometimes while still providing aggressive ink reductions in all other colors. Banding artifacts caused by high slopes in conventional gray component replacement (GCR) methods can be minimized. The printable gamut, especially in shadow areas, can also be maximized. None, some, or all of these benefits may be present in various embodiments.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Image processing work flows often require the conversion of files from one color space to another, such as from a three color component model like a Red, Green, Blue (RGB) color model to a four component model like the Cyan, Magenta, Yellow, and Key (CMYK) color model. For example, a desktop publishing file may be created and edited using a desktop publishing software program that consistently used a source RGB color space defined by a first International Color Consortium (ICC) profile. That file may then be sent to a printing press that uses destination CMYK color space defined by a second ICC profile. In order to print the desktop publishing file in a way that preserves the intended color, the printing press may convert the file from the source color space to the destination color space using the ICC profiles.

The conversion from a three color component space to a four color component space introduces some redundancy. That is, the fourth color component carries information that may be conveyable using the other three components. This can be seen more clearly in the example of the CMYK color space, where the cyan, magenta, and yellow components are the primary components that can be added in varying intensities to produce many colors in the gamut. For example, a dark gray color can be produced by mixing equal intensities of the cyan, magenta, and yellow components. The black (K) component, however, may also be used alone to produce the same dark gray color. In this case, the black component ink "replaces" the ink of the cyan, magenta, and yellow components. The same dark gray color may be created using a mix of all four component inks. Similarly, other non-gray colors may be rendered using varying amounts of black ink. Thus, a color value in an RGB color space can be represented in a number of ways in a CMYK color space by using the varying intensities of the black component ink to replace some or all of the combined cyan, magenta, and yellow component inks. This concept is illustrated in FIG. 1.

Figure 1A:
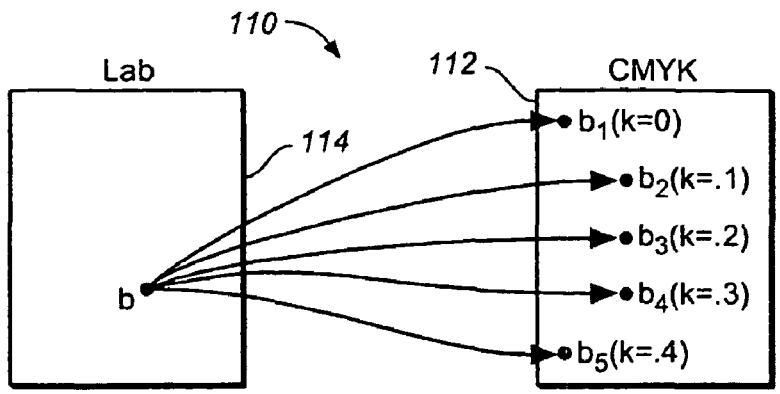
FIG. 1A illustrates an example one-to-many mapping from a source CIE Lab color space to a destination CMYK color space.

FIG. 1A is an illustration of a mapping 110 between a three component space, such as CIE Lab, to a four component space, such as CMYK. Color value b in the Lab color space 114 maps to multiple possible color values, namely representative values b1, b2, b3, b4 and b5, in the CMYK color space 112. Color value b in the CIE Lab color space 114 may also be mapped to additional possible color values in the CMYK color space 112. Each of these multiple color values in the CMYK color space 112 is represented by different, albeit colorimetrically equivalent, combinations of values for the C, M, Y, and K color components. Although each of the multiple possible color values are colorimetrically equivalent, they nonetheless may be rendered slightly differently when actually printed. For example, black dots may be noticeable when rendering b5, which has a K component value of 0.4, but not when rendering b1, which has a K component value of 0. One may prefer, for whatever reason, one of these renderings over the other. To determine which of the multiple possible values to which to convert the input color value, conventional systems generally have attempted to ascertain the appropriate value for one of the color components, specifically the K component, using a variety of methods that usually are a function of the input color space, as represented by the following equation:

$$K_b = f_k(L_b, a_b, b_b) = 0.3 \quad (Eq. 1)$$

Figure 1B:
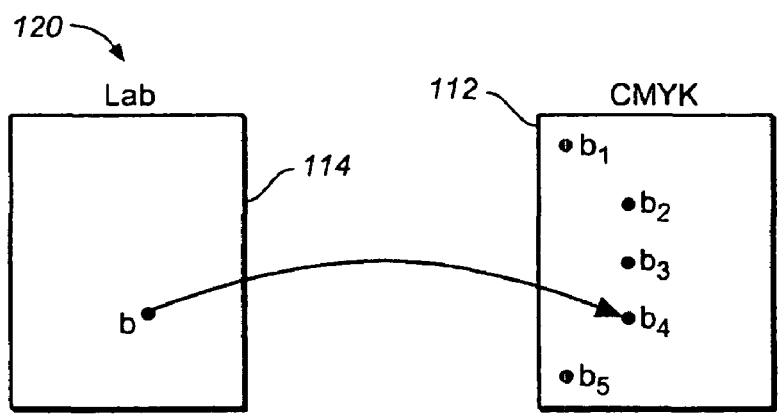
FIG. 1B illustrates an example one-to-one mapping from a source CIE Lab color space to a destination CMYK color space.

A conventional method, $f_k$, may typically determine a gray estimate from the input values ($L_b$, $a_b$, $b_b$) and use that gray estimate along with a gray component replacement (GCR) curve to determine a K value. In this example, the conventional method, $f_k$, determines that the appropriate K is 0.3 as shown in Eq. 1. This determined K along with the input color value b can be used in a conversion function to determine a desired or preferred output color value, which in this case is b4. Thus, the input color value b can be used to determine a preferred output value b4 using a conventional method that first determines the output color value's K component value as a function of the input color value and then uses the K component value along with the input color value to determine the remaining color component values of the preferred output color value, which in this example are the C, M, and Y component values. FIG. 1B illustrates the mapping 120 between color value b of the CIE Lab color space 114 and color value b4 in the CMYK color space 112.

As mentioned above, of the various ways to represent a color in the CMYK color space, one combination of the C, M, Y and K component values may be generally preferred, desired, or considered optimal. This preference may be based on achieving a certain look. For example, black ink may not be preferred in flesh tones or light colors. The preferred or desired combinations of C, M, Y, and K component values may be determined from any combination of inputs. The desired combinations may be derived from a GCR or black generation profile, for example, which may indicate the black start for various combinations of the C, M, and Y components and/or which may describe a black ink curve relating black component levels to various levels of the C, M, and/or Y components. The desired combinations of C, M, Y, and K component values may also be derived from a file containing preferred combinations that span the gamut of the CMYK color space. The file can be picture or photograph having color data that conform to the desired GCR profile or black generation levels.

Techniques can be implemented to identify a desired or preferred color value when converting a color value from a source color space (such as RGB, CIE Lab, and the like) to a destination color space having more color components than the source color space (e.g., CMYK and CcMmYK). In general, an input color value in the source color space is converted to an output color value in the destination color space using an intermediate color space having the same number of color components as the source color space. The color values in the intermediate color space correspond to the preferred values in the destination space. A first mapping or conversion process can be used to associate the destination color space to the intermediate color space. A second mapping or conversion process can be used to associate the destination color space to the source color space. The mappings or conversion processes can then be used to associate the intermediate color space with the source color space, which is determinable (because it is a one-to-one mapping), unlike the one-to-many mapping from the source color space to the destination color space (at 110). After the mappings and/or conversion processes are determined, an input color value can first be converted to an intermediate color value and then ultimately to a destination color value. In the case of a conversion to a CMYK color space, for example, the desired or appropriate combination of C, M, Y, and K components is determined without first determining an optimal K component value corresponding to the input color value.

Benefits of some embodiments include maximizing ink reduction without loss of saturation or gamut, possibly up to 66% ink savings. Also, black dots may be eliminated in pure yellow printed areas, sometimes while still providing aggressive ink reductions in all other colors. Another benefit may be minimizing banding artifacts caused by high slopes in conventional gray component replacement (GCR) methods. Also, a benefit may be maximizing the printable gamut, especially in shadow areas. A further benefit may include being able to control black generation levels or the GCR, such as black start/end and GCR curve/shape or its equivalent, for essentially any point or tuple in the gamut of the printing press. Another benefit may be the elimination of the difficult calculation of an optimal K value using the input values. The determination of a desired or preferred combination of output color component values can be done in the device space, and thus can be performed totally independent of a colorimetric color space, which may be advantageous. None, some, or all of these benefits may be present in various embodiments.

Figure 2A:
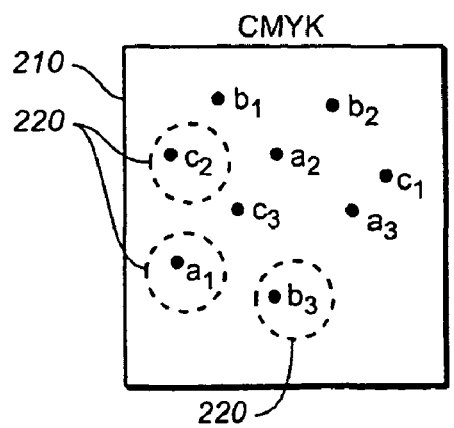
FIG. 2A illustrates an example destination CMYK color space.
Figure 2B:
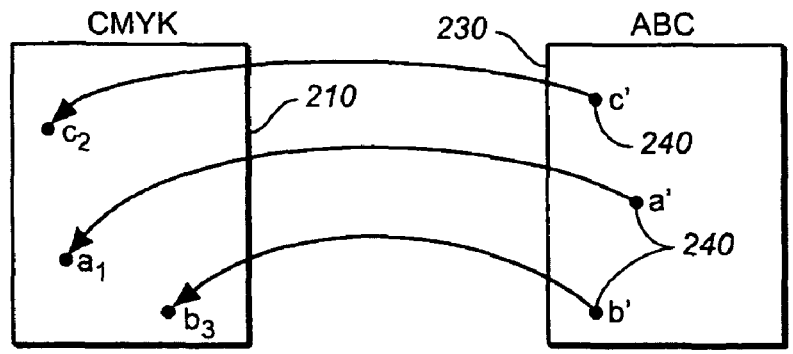
FIG. 2B illustrates an example mapping between intermediate and destination color spaces.

As shown in FIG. 2A, a destination color space 210 includes numerous color values. Some color values, such as b1, b2, and b3, may be colorimetrically equivalent, i.e., they correspond to the same color b, which may be defined in an independent color space, such as CIE Lab, as described above with respect to FIG. 1. Some colors, such as pure white or (0,0,0,0) in the CMYK color space, may have only one colorimetrically equivalent color value. Of the colorimetrically equivalent color values in the output space, one of those may be preferred over the others. The preferred color values 220 may share certain characteristics. For example, they may conform to a common GCR or black generation profile. The preferred color values 220 may be determined in a variety of ways, such as from a black generation or GCR profile and/or a file containing preferred combinations. After the preferred color values 220 are identified or determined, the preferred color values 220 are used to determine the intermediate color space 230, as shown in FIG. 2B. The intermediate color space 230 can be a non-colorimetric (i.e., device dependant) color space that includes intermediate color values corresponding to preferred color values in the destination space. The number of color components in the intermediate color space can be equal to the number of color components in a potential source color space. Different intermediate color spaces can be generated for source color spaces with different numbers of color components. Preferred color values 220 can correspond to intermediate color values 240 in the intermediate color space

230. For example, c' of the intermediate color space 230 corresponds to c2 of the destination color space 210 and a' corresponds to a1.

Figure 3:
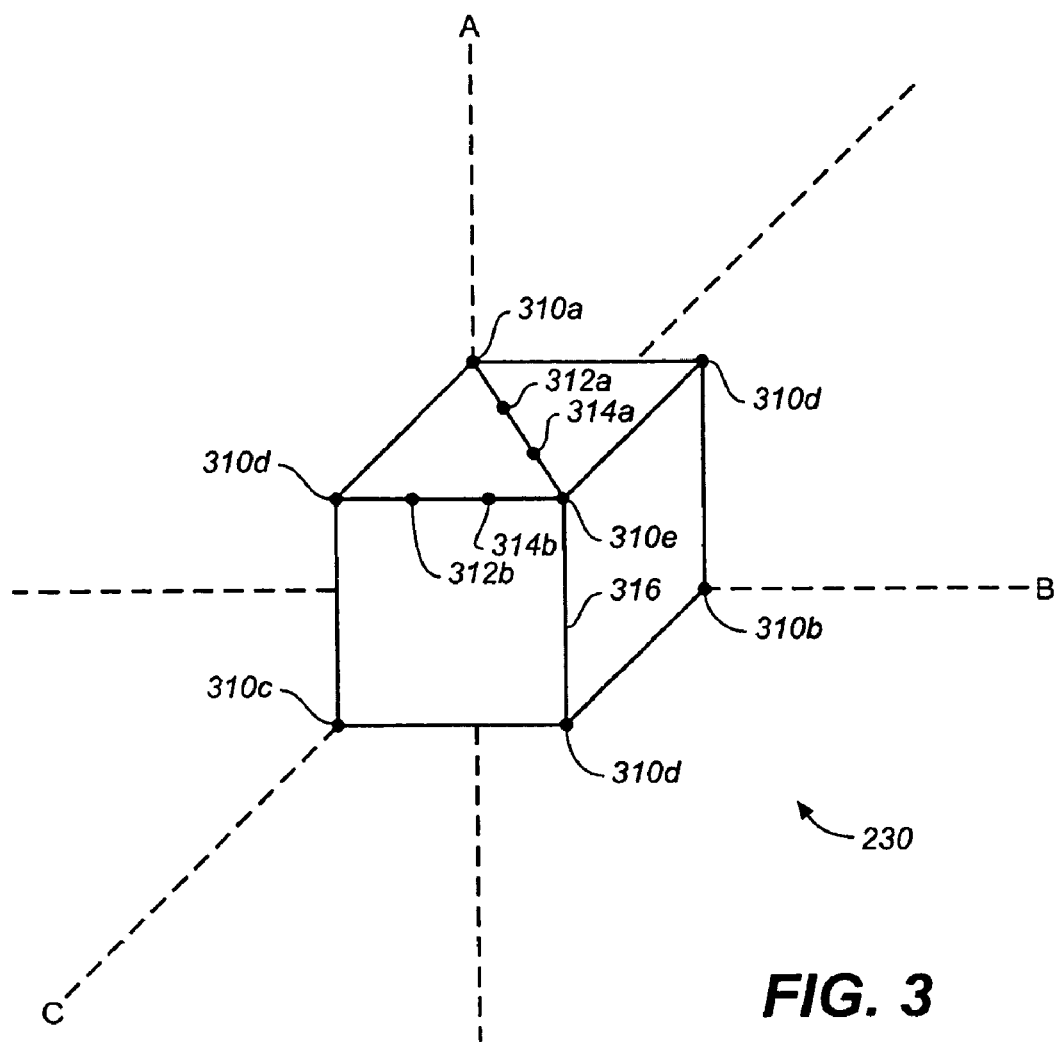
FIG. 3 illustrates an example intermediate ABC color space.

FIG. 3 illustrates an example intermediate color space 230. The gamut of the intermediate color space 230 forms a cube. Each axis (A, B, and C) represents a color component of the intermediate color space and can roughly correspond to the color components of the destination color space. For example, if the destination color space is a CMYK color space, then the A component could roughly correspond to cyan, the B to magenta, and the C to yellow. The black component could be reflected partly in each of the A, B, and C components. Using this mapping, the vertices 310 can correspond the brightest primary and secondary colors and brightest and darkest neutrals in the destination space. For example, vertex 310*a*, with coordinates (1,0,0) can correspond to pure cyan in a CMYK destination space. Vertices 310*b* and 310*c* (at coordinates (0,1,0) and (0,0,1) respectively) can correspond respectively to pure magenta and yellow. The vertices 310*d* can correspond to the secondary colors, which for a CMYK color space are red, green, and blue. The vertex 310*e* (at coordinate (1,1,1)) and vertex (0,0,0), which is not shown, are the extreme neutral colors black and white, respectively. The vertex 310*e* corresponds to a color value in the destination space that represents total area coverage for a black neutral, which is the darkest black that can be reproduced in the destination color space. The white point (0,0,0) can correspond to (0,0,0,0) in the destination CMYK color space.

Once the extremes of the intermediate color space 230 are defined, other more internal points may be determined. Some points of interest that may be defined are the black start color values (at 312) as colors progress from each of the vertices (at 310*a*, 310*b*, 310*c*, 310*d*, and white) towards black 310*e*. The darkest, most saturated colors are along the edges from the secondary colors 310*d* to total black 310*e*. The first point (at 312) along an edge 316 can correspond to the darkest, most saturated edge color having a black component of zero in the destination color space; this point 312 corresponds to the black start along the edge. The same could be done along each diagonal path from each primary color (at 310*a*, 310*b*, and 310*c*) to total black 310*e*, to determine black starts 312 along each diagonal path. Similarly, a black start 312 for the neutral colors along the path from white to total black 310*e* can correspond to the darkest neutral color having a black component of zero in the destination color space. Other points of interest, such as point 314, can correspond to the darkest most saturated points along the edges and diagonals where the black component stops increasing and other component inks are added to make the color darker in the destination color space; these points 314 correspond to the black maximum points along the edges and diagonals.

The spacing of the points of interest between the vertices may be determined in a variety of ways. For example, the black start points 312 and black max points 314 can be equally spaced along the edges and diagonals. If maximum value for each component is one, then point 312*b* can have a coordinate value of (1,⅓,1) and point 314*b* can have a coordinate value of (1,⅔,1). Similarly, the coordinate value of point 312*a* can be (1,⅓,⅓). Other points of interest in the destination color space can be structured into the intermediate color space at various intervals between the vertices 310, which can be used to better approximate a desired GCR/black generation profile.

The conversion process used to convert from the intermediate color space 230 to the destination color space 210 can be defined algorithmically or using a lookup table. A lookup table may have several intermediate color value 240 entries which span the gamut of the destination color space and include the points of interest described in FIG. 3. For example, some entries can correspond to the substantially brightest and darkest neutral colors in the destination color space (e.g., the brightest white, where typically no component inks are used, and the darkest black, where typically the maximum component inks permitted by the total area coverage (TAC) are used), and correspond to the most saturated primary (e.g., cyan, magenta, and yellow in a CMYK color space) and secondary colors (e.g., red, green, and blue in a CMYK color space). Additionally, color values at the black start (i.e., the point where the black ink component starts to replace the other inks and transitions from zero to a non-zero value) and at the black max (i.e., the point where the black ink component stops increasing as the color approaches the darkest black) may also be included as entries. Some or all of these points by themselves or in addition to other preferred color values may be used to construct a lookup table. For example, additional entries may be added to correlate conversions with a particular GCR or black generation profile. Any combination of points of interest described above or others can be used to create a lookup table mapping the intermediate color space 230 to the destination color space 210. Interpolation can also be used to populate further in a lookup table the intermediate color value entries and their corresponding destination color values.

Figure 2C:
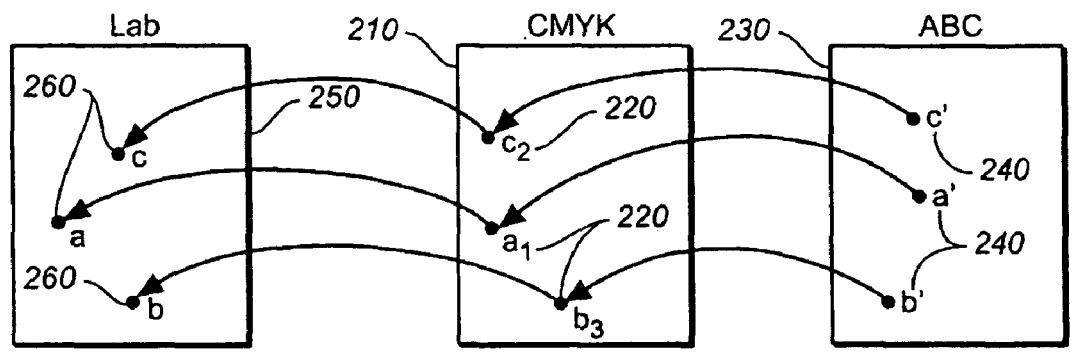
FIG. 2C illustrates an example mapping between intermediate, destination, and source color spaces.
Figure 2D:
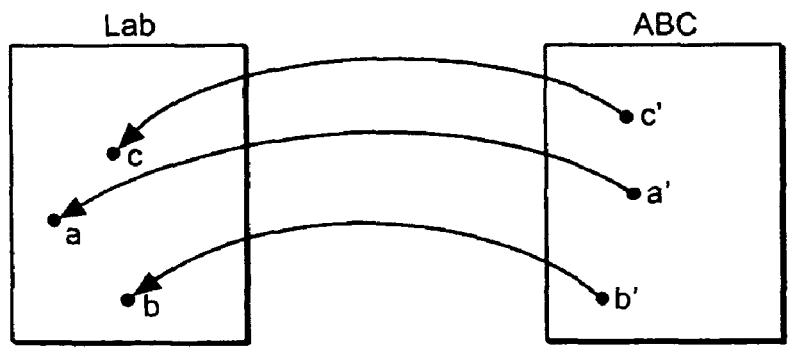
FIG. 2D illustrates an example mapping between intermediate and source color spaces.

Turning to FIG. 2C, the conversion process for converting color values from a destination color space, such as a CMYK color space, to an input color space 250, such as device independent CIE Lab, is often defined in an ICC profile. This relationship can be used to determine color values 260 in the input space 250 that correspond to preferred color values 220 in the output space 210, which is a many to one relationship, where more than one value in the destination color space 210 may correspond to one value in the input color space 250. Unlike the one-to-many relationship described in FIG. 1, which leads to an undeterminable mapping, the many-to-one relationship is determinable. That is, for any given color value in the destination color space 210, there exists only one corresponding color value in the input color space. The conversion process of color values from intermediate color values 240 to destination preferred color values 220 and from destination preferred color values 220 to input color values 260 can be used to determine a conversion process of color values from intermediate color values 240 to input color values 260, as shown in FIG. 2D. The conversion process of color values from the intermediate color values 240 to input color values 260 can be used to also convert an input color value to an intermediate color value using a reverse lookup method or other methods known in the art.

The conversion process does not have to be linear. The conversion process can include a process for smoothing color values near the black start color values. The smoothing can be accomplished by converting the intermediate color value to a preliminary destination color value. For example, an ABC color value 240 can be converted to a CMYK' color value, where K' is a pre-smoothed black component value. K' can be converted to a final K value by applying an "s-shaped" function, such as a sigmoid function, for K values near the black start color value where the values of K transition from 0 to 1. The smoothed values can be used to create a conversion process from the intermediate color space to the input color space in a manner similar to that described with respect to FIG. 2C and FIG. 2D.

Figure 4:
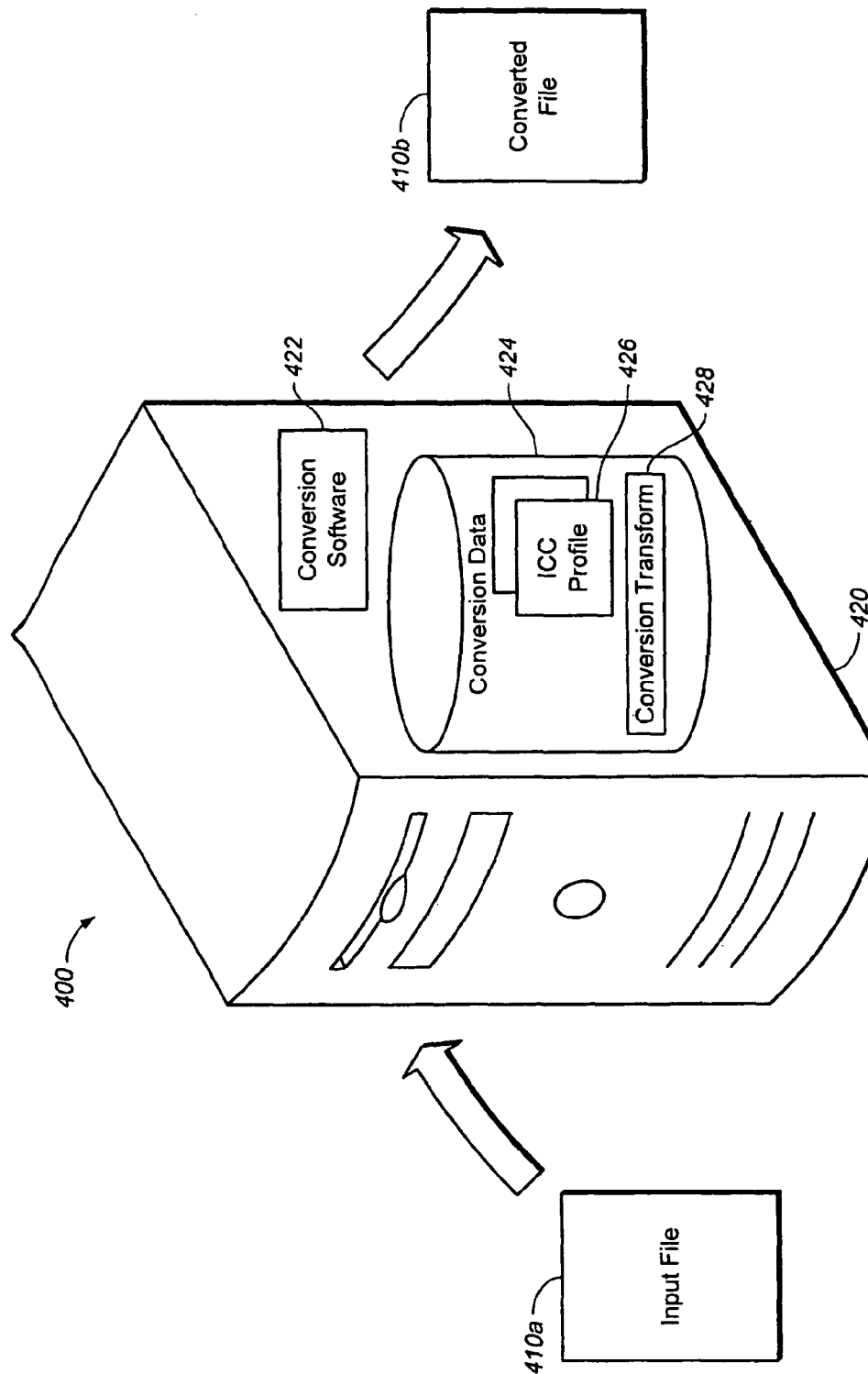
FIG. 4 is a block diagram of a color conversion system.

As shown in FIG. 4, a color conversion system 400 includes a processing machine 420 that receives an input file 410 having colors expressed in a source color space and transmits a converted file 410b having colors expressed in a destination color space. The processing machine 420 includes conversion software 422 and conversion data 424 that stores ICC profiles 426. Generally, the conversion software 422 determines for each color value in the input file 410 a corresponding color value in a destination color space based on a mapping or conversion to an intermediate color value. A color value in the input color space may correspond to multiple color values that are colorimetrically equivalent to each other in the destination color space. One of the multiple color values, however, may be preferred over the others. A group of preferred color values can be mapped to intermediate color values in an intermediate color space that has the same number of components as the source color space. A relationship between the intermediate color values and the source color values may be established using the intermediate-to-destination mapping and a process for converting from the destination color space to the source color space. The conversion software 422 may use this relationship to convert color values in the input file 410 to preferred color values in the destination color space. The conversion software 422 may include other functionality such as gamut mapping, transforming the input color values to one or more intermediate color spaces, and applying conversion methods.

The input file 410a and converted file 410b (collectively, files 410) each may be any collection of electronic data that includes color data defined in one or more color spaces. The input file 410a generally includes color data in an input color space and the converted file 410b generally includes color data in a destination color space. The files 410 may also include other data, such as text, embedded fonts, images and 2D vector graphics data (data in addition to related color data), digital rights management information, and other types of non-color data. The files 410 may adhere to a given specification or format, including, for example, Extensible Markup Language Paper Specification (XPS), portable document format (PDF), Joint Photographic Experts Group (JPEG), Tagged Image File Format (TIFF), and Portable Network Graphics (PNG) file formats. The input color space may be based on any of a variety of color models, such as RGB, CMYK, YCrCb, CIE Lab, CIE LCH, and many others. The input color values may be converted to color values in another color space, such as a color space with fewer color components, before being converted to the destination color space. For example, the input file may have color values initially in a CMYK color space that are converted to a CIE Lab color space before ultimately being converted to a destination CMYK color space by conversion software 422. The destination color space may be based on any of a variety of color models and color spaces that include a black component, such as, for example, CMYK and CcMmYK. The input file 410a may also include an ICC profile that defines the color space or color spaces used within the file.

The processing machine 420 is any apparatus, device, or combination of machines for processing data, including, for example, a programmable processor, a computer, or multiple processors or computers. The processing machine 420 can include, in addition to hardware, code that creates an execution environment for the computer program in question, e.g., code that constitutes processor firmware, a protocol stack, a database management system, an operating system, or a combination of one or more of them. The processing machine 420 includes color conversion software 422 and conversion data 424.

Generally, the color conversion software 422 may be a computer program that is executed by the processing machine 420 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one processing machine 420 or on multiple processing machines 420 that are located at one site or distributed across multiple sites and interconnected by a communication network.

The conversion data 424 facilitates the transformation of color data from the input/source color space to destination color space of the converted file 410b. The conversion data 424 may be described in a table, a matrix, a formula, a flat file, a lookup table, a computer program, or any combination of these. The conversion data 424 may describe or embody any type of processing that is usually associated with color conversion. The processing may be a single step or a series of steps that may utilize any combination of formulas, matrices, or lookup tables. The conversion data 424 may include one or more ICC profiles 426. Generally, an ICC profile 426, associated with a particular color space, is a file that contains information for converting color values from the particular color space to another, usually device-independent, color space and vice-versa.

In operation, the processing machine 420 receives input file 410a and executes the color conversion software 422. The input file 410a may be received from memory, a storage device, or input from a network or an input device. The color data in input file 410a can be defined in virtually any color space. The only limitation is that the color space of the input file (i.e., the source color space) has fewer color components, or be converted to a color space having fewer components, than the color space of the converted file (i.e., the destination color space). Each of the color values in the input file 410a can be converted to a color value in the destination color space and output in converted file 410b using conversion software 422, which in turn uses the conversion data 424.

The conversion data 424 can include data related to converting between the source and destination color spaces, which may include or be derived from data relating each to an intermediate color space that has the same number of color components as the source color space. A portion or all of the conversion data 424 related to the intermediate color space can be created before the execution of the conversion software 422 and stored in an ICC profile, or created during the execution of the conversion software 422. The conversion data 424 can be captured using one or more lookup tables. Various points of interest in the destination color space can be used to construct a lookup table that relates the intermediate color space to the destination color space. These points of interest may include any or all of the following: the most saturated primary and secondary colors, the darkest and brightest neutral colors, and the color values at the black start and black maximum as the saturated primary and secondary colors are darkened or transition to the darkest neutral color. Other points of interest may also be included. These destination points of interest can be structured in the intermediate color space using the primary and secondary colors and the darkest and brightest neutral colors as boundaries in the intermediate lookup table, and spacing of the other points of interest between the boundaries. Interpolation using the points of interest can also be used to populate other entries in the lookup table. This lookup table may be included in conversion data 424 or may be used to derive one or more other lookup tables in conversion data 424 that relate the source color space directly to the destination color space.

The conversion data 424 can be used by the conversion software 422 to convert the color values in the input file 410a. An input color value can be identified or derived from the input file 410a and converted to an intermediate color value by using a conversion process that relates color values in the intermediate color space to color values in the input color space. A reverse lookup or search and interpolation can be performed where the conversion process involves a lookup table that maps intermediate color values to color values in the input color space. A search for the intermediate color value that converts to the desired input color value can be performed to obtain the intermediate color value. Other methods can also be used. A destination color value can be obtained from the intermediate color value using a conversion process that relates the color values in the intermediate color space to color values in the destination space. The destination color value can be store in the converted file 410b. This process can be repeated for each color value in the input file 410a for which conversion is desired.

Figure 5:
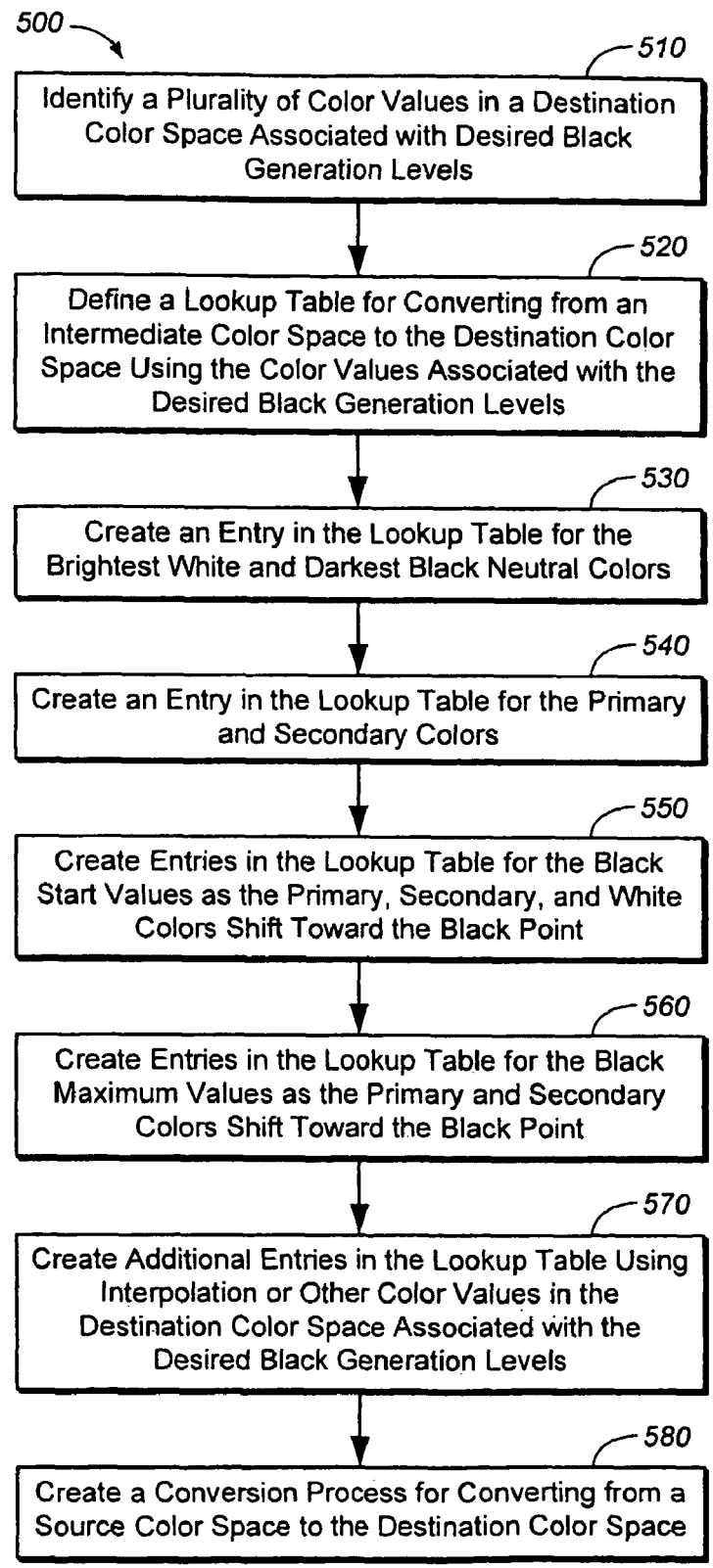
FIG. 5 is a flow chart illustrating a process for creating a lookup table for converting from an intermediate color space to a destination color space.

FIG. 5 is a flow chart illustrating a process 500 for creating a lookup table for converting from an intermediate color space to a destination color space. At 510, a plurality of color values in the destination color space is identified, where each of the color values is associated with desired black generation levels and/or a desired GCR profile. The color values may be identified in a variety of ways. For example, the color values may be gathered from an input file, such as a digital photograph or picture, containing color values spanning the destination gamut that conform to desired black generation levels and/or a desired GCR profile. Also, a GCR profile and/or black generation levels may be directly defined and used to determine desired color values in the destination color space. Any combination of these and other methods may be used to identify the desired or preferred color of the destination color space.

At 520, the desired color values in the destination color space can be used to define a lookup table for converting from an intermediate color space to the destination color space. The intermediate color space may have fewer color components than the destination color space. Each of the color values in the intermediate color space can correspond to a preferred or desired color value in the destination color space. At 530, an entry can be defined in the lookup table that corresponds to the brightest white and another for the darkest black. The brightest white is typically defined in the destination color space, such as a CMYK color space, as (0,0,0,0). This value can be entered to correspond to a point in a three-dimensional intermediate color space of (0,0,0). Black in the destination color space may be the darkest neutral color, which is not necessarily (1,1,1,1) in a CMYK color space because of TAC (total area coverage) constraints. The TAC constrained black point may be, for example, (0.8,0.7,0.7, 0.9). The black point can be entered into the lookup table to correspond with the point (1,1,1) in the intermediate color space.

At 540, an entry for each of the primary and secondary colors may be created. For a CMYK destination color space, the primary colors may be cyan, magenta, and yellow, and the secondary colors may be red, blue, and green. Typically, the primary colors at maximum saturation can be represented in a CMYK color space by setting all color components to zero except for the component corresponding to the primary color, e.g., (1,0,0,0) can represent maximum saturation of cyan. The secondary colors can be similarly determined by setting all color components to zero except for the two components that can be mixed to obtain the secondary color, e.g., (1,1,0,0) can represent blue. The black component can be zero in each of these instances. A corresponding value in the intermediate color space can be determined in a similar manner, where the color components of the intermediate color space roughly correlate with the color components of the destination color space. For example, in an ABC intermediate color space, the intermediate A component may roughly correlate with the C component of a destination CMYK color space, and the B component may roughly correlate with the M component. The primary color cyan may be entered into the lookup table with (1,0,0) of the intermediate color space being mapped to (1,0,0,0) of the destination color space.

At 550, an entry in the lookup table can be determined for each of the black start color values as the primary, secondary, and white colors shift toward black. The intermediate color value that is one third of the distance from a primary color can be mapped to the black start color value in the destination color space as the primary color gets darker. For example, as the primary color cyan gets darker in the destination color space, the color value just before the point where black ink is added to make the cyan darker can be the black start color value. This color value in the destination color space can be mapped in the lookup table to a color value that is one third the distance from the cyan point to the black point of the intermediate color space, which for example may be (1, ⅓, ⅓). The black start color value can be determined and mapped in the lookup table for each of the primary, secondary, and white colors.

At 560, an entry in the lookup table can be determined for each of the black maximum color values as each of the primary and secondary colors shift to black. The intermediate color value that is two-thirds the distance from a primary color can be mapped to the black maximum color value in the destination color space as the primary color gets darker. For example, as the primary color cyan gets darker in the destination color space, the color value where black ink stops being added to make the cyan darker (other color components such as magenta and yellow may be increased and the cyan component may be decreased) can be the black maximum color value. This color value in the destination color space can be mapped in the lookup table to a color value that is two-thirds the distance from the cyan point to the black point of the intermediate color space, which for example may be (1, ⅔, ⅔). The black start color value can be determined and mapped in the lookup table for each of the primary and secondary colors.

At 570, additional entries in the lookup table can be created using interpolation or other color values that conform to the desired black generation levels and/or a desired GCR profile. For example, a digital photograph containing colors that span the gamut may conform to a complex GCR/black generation profile. In that case, more color values from the destination space that can be entered into the lookup table can lead to a mapping that better approximates the complex GCR/black generation profile. Points where the black component value is greater than zero can be of particular interest because the GCR/black generation profile before the black start color value is typically simple (e.g., no black ink before the black start point) compared to the profile after the black start color value where it can increase quickly or slowly depending on the profile.

At 580, the lookup table can be used to create a conversion process for converting from a source color space to the destination color space. The conversion process may include one or more lookup tables. The conversion process may convert directly from the source color space to the destination color space. A conversion process may be created using the lookup table described at 570 for converting from an intermediate color space to the destination color space and a known lookup table for converting from destination color space to the source color space. A table mapping the intermediate color space to the source color space can be created using these two lookup tables. A reverse lookup may be implemented in the conversion process such that an intermediate color value may be determined from an input color value using the intermediate to source table. The intermediate color value can then be used with the intermediate to destination table to determine a corresponding destination color value.

The conversion process may use a table mapping the source color space to the intermediate color space that can be created by inverting the table that maps the intermediate color space to the source color space. This table along with the intermediate to destination table could be used separately in the conversion process to convert from a source to the destination color space using the intermediate color space. These tables can also be combined in the conversion process to convert directly from the source to the destination. The direct conversion process can be created using the intermediate to destination mapping in conjunction with the source to intermediate table to create a mapping from the source to destination color spaces. The conversion process may include all, some, or none of these lookup tables. The conversion process may also use algorithms and other functions or data to facilitate converting an input color value to a destination color value.

Figure 6:
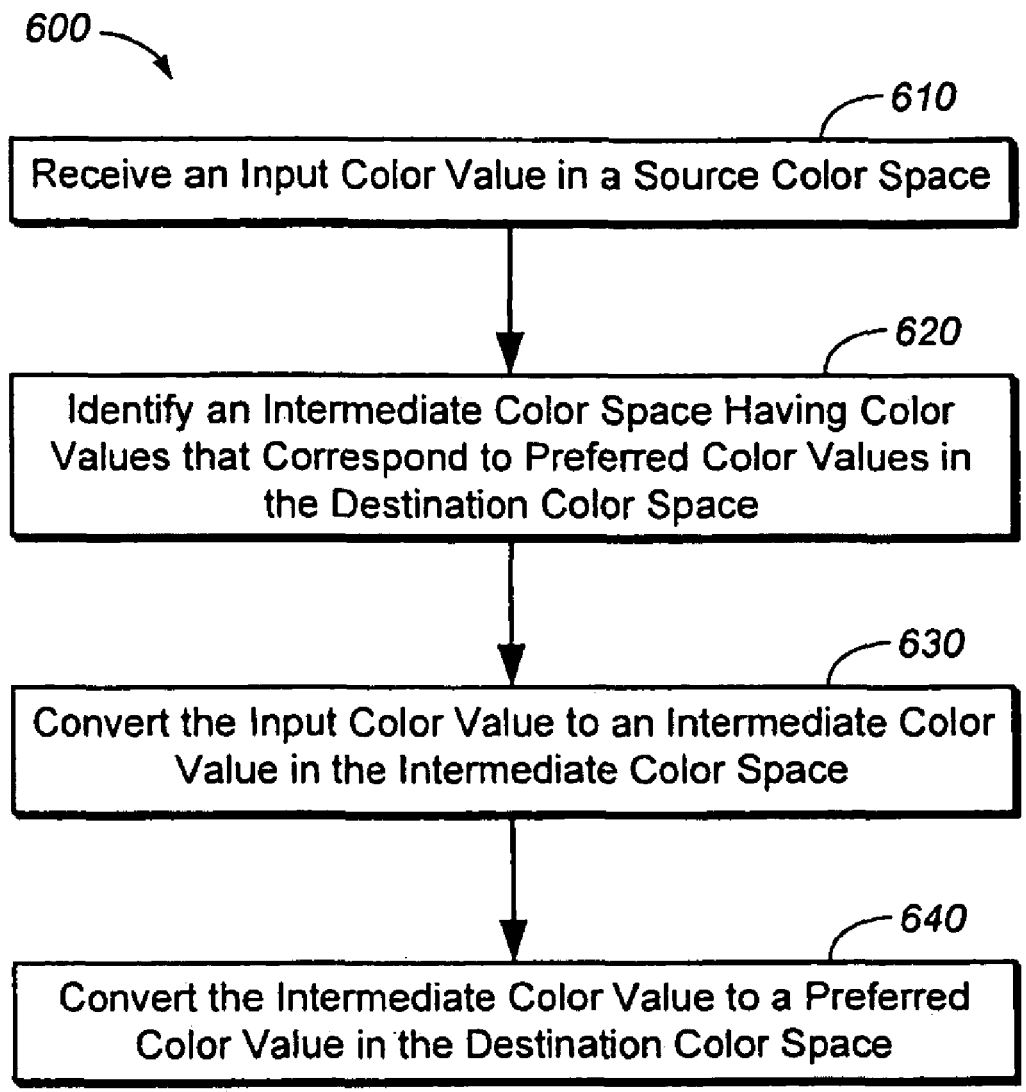
FIG. 6 is a flow chart illustrating a process for converting an input color value in a source color space to a preferred color value in a destination color space using an intermediate color space.

FIG. 6 is a flow chart illustrating a process for converting an input color value in a source color space to a preferred color value in a destination color space using an intermediate color space. At 610, an input color value is received for conversion from a source color space to a destination color space. The input color value may be input from a variety of sources. For example, the input color value be read from an input file, from memory, or any other source. The input color value can be defined in a source color space, which can be virtually any color space, such as RGB or CIE Lab. The source color space can have fewer color components than the destination color space. Such would be the case when converting from CIE Lab to CMYK, from RGB to CcMmYyK, and many other possible variations.

At 620, an intermediate color space is identified. The intermediate color space can have the same number of color components as the source color space. The intermediate color space can also include color values that correspond to preferred color values in the destination color space. When converting from a source color space to a destination color space that has more color components, such as a black ink component in addition to other components, the mapping from the source color space to the destination color space may not be determinable. For example, a RGB value of (0.1, 0.1, 0.2) may correspond to a CMYK value of (0.9, 0.9, 0.8, 0), (0.5, 0.5, 0, 0.8), or a host of other color values that have different combinations of the C, M, Y, and K component values. One of these values may be preferred over others. For example, because the color is a fairly dark color, a higher black component value may be desired to decrease ink or to provide greater contrast in shadow areas and the preferred combination may be (0.5, 0.5, 0, 0.8) for the CMYK color value. A set of these preferred color values may be captured in the intermediate color space and/or lookup table. The set may include certain points that may be of interest, such as the black start color values, the black maximum color values, and the primary and secondary colors.

One or more conversion processes relating the intermediate color space to both the destination color space and the input color space may be predetermined. For example, a conversion process relating the intermediate color space to a source color space may be stored in an ICC profile along with conversion processes for converting from the destination color space to the source color space. Conversion processes for converting from a device-specific destination color space to other color spaces, such as a device-specific color space like RGB or a device-independent color space like CIE Lab are typically known and defined in an ICC profile. These conversion processes can be used to ultimately relate the intermediate color space with one or more source color spaces.

At 630, the input color value can be converted to an intermediate color value in the intermediate color space. A conversion process can be used to determine an intermediate color value from the input color value. For example, the conversion process includes a lookup table relating intermediate color values to input color values, a search of the table can be used (along with interpolation when appropriate) to determine an intermediate color value corresponding to the input color value. At 640, the intermediate color value can be converted to a preferred color value in the destination color space using a conversion process for converting from the intermediate color space to the destination color space. Even though the intermediate color space may have fewer color components than the destination color space, because the intermediate color space was defined using preferred values in the destination color space, the mapping is determinable, that is each value in the intermediate space corresponds to only one value in the destination color space. The conversion process can relate the input color space directly with the output color space, without converting explicitly through the input color space as described in FIG. 5 at 580.

Figure 7:
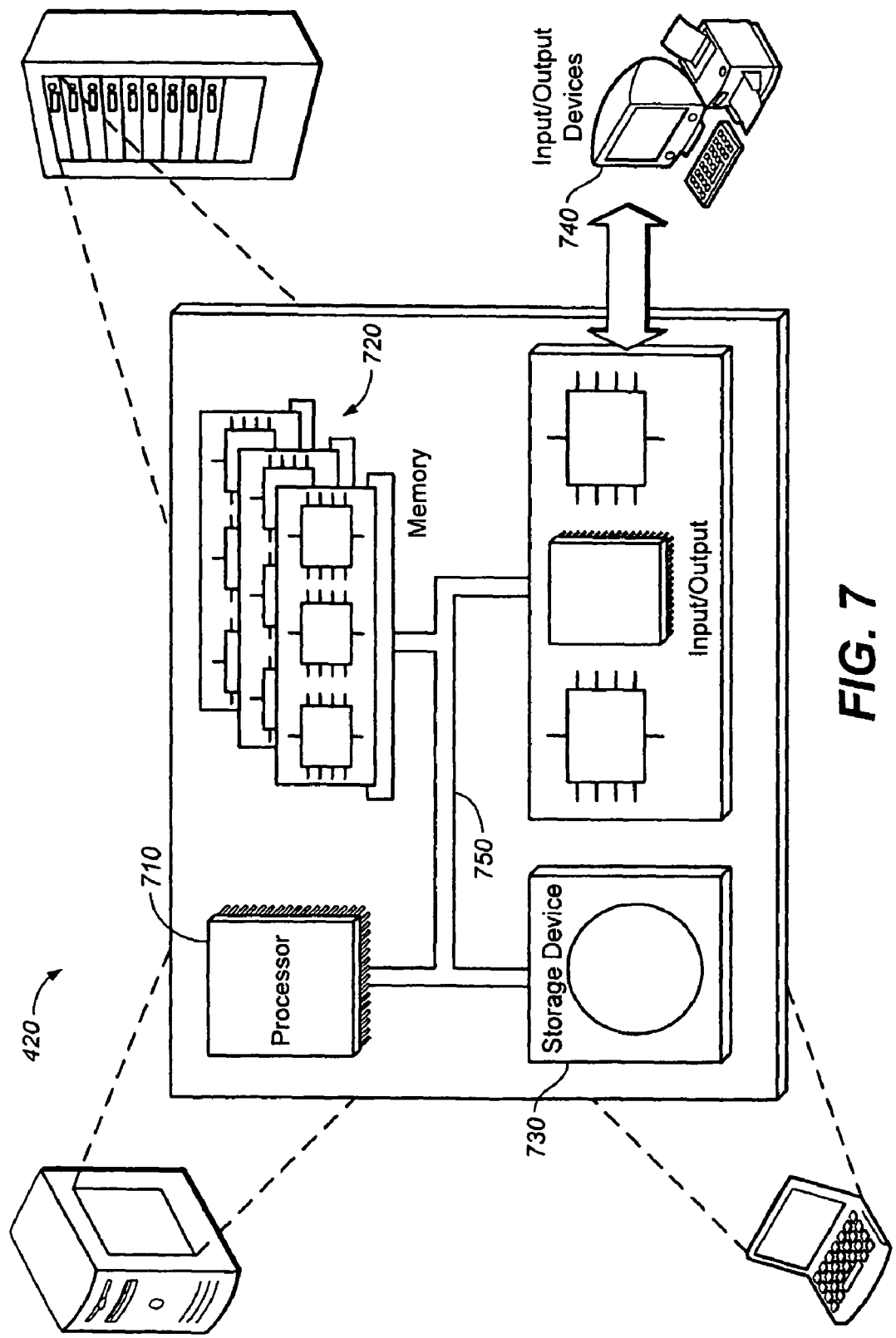
FIG. 7 illustrates an example a processing machine that can be used with the system of FIG. 4.

FIG. 7 illustrates an example processing machine 420. In general, the processing machine 420 includes a processor 710, memory 720, storage device 730, input/output devices 740, and communications bus 750, which allows the other devices to communicate with one another. Input and output devices 740 include any device that may interact with a processing machine 420, such as printers, monitors, keyboards, trackballs, mice, networks, etc.

A processor 710 may be suitable for the execution of a computer program, and includes, by way of example, both general and special purpose microprocessors, and any one or more processors of any kind of digital computer. Moreover, the processor 710 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 720.

The memory 720 and storage device 730 are computer readable media suitable for storing computer program instructions and data. The memory 720 may be any form of volatile or non-volatile memory, media and memory devices, including by way of example semiconductor memory devices, e.g., DRAM, SRAM, EPROM, EEPROM, and flash memory devices. The storage device 730 may be any form of non-volatile memory, such as magnetic disk drives, e.g., internal hard disks or removable disks; magneto optical disk drives; and CD ROM and DVD-ROM disk drives. The processor 710 and the memory 720 can be supplemented by, or incorporated in, special purpose logic circuitry.

Although CMYK is often used throughout this specification as an example destination color space, it shall be understood that other types of color spaces may be used as the destination color space, such as CcMmYyK, Hexachrome (available from Pantone Inc. of Carlstadt, N.J.) or other multi-ink color spaces. The described techniques can be used with any destination color space that has a greater number of color components than the input color space.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Also, because the intermediate color space to destination color space relationship defines a GCR profile but not colorimetry, a single fixed intermediate to destination table can be used for many different destination devices. These different destination devices, each with unique colorimetry, may require device-specific tables to convert from an independent source color space to the intermediate color space.

What is claimed is:

1. A method comprising:
    identifying a plurality of preferred color values in a destination color space, each preferred color value being one of a set of colorimetrically equivalent color values, the destination color space having color values defined by a particular number of color components;
    defining intermediate color values in an intermediate color space, the intermediate color values corresponding to the plurality of preferred color values, the intermediate color space having a number of color components that is less than the particular number of color components of the destination color space;
    identifying a known mapping from the destination color space to a source color space, wherein the source color space differs from the intermediate color space;
    using the intermediate color values and the known mapping to determine a conversion process for converting source color values to preferred color values in the destination color space; and
    converting, by operation of a computer, a source color value in the source color space to a preferred color value in the destination color space using the conversion process.

2. The method of claim 1, wherein the source color space includes the same number of components as the intermediate color space.

3. The method of claim 2, wherein the destination color space includes cyan, magenta, yellow, and black color components, and wherein the conversion process comprises:
    converting the source color value to a first destination color value using the intermediate color values, the first destination color value having a black color component value that is not smoothed; and
    determining the preferred color value by applying a smoothing function to the black component value to obtain a new black component value.

4. The method of claim 2, wherein the conversion process comprises:
    converting the source color value to an intermediate color value; and
    converting the intermediate color value to the preferred color value in the destination color space.

5. The method of claim 1, wherein using the intermediate color values and the known mapping to determine the conversion process comprises using a lookup table having entries that are associated with the intermediate color values and the plurality of preferred color values in the destination color space.

6. The method of claim 1, wherein the plurality of corresponding preferred color values in the destination color space comprises a plurality of color values associated with primary colors, secondary colors, a substantially darkest neutral color, a substantially brightest neutral color, black start colors, and black maximum colors.

7. The method of claim 1, wherein the destination color space comprises color components that include a cyan component, a magenta component, a yellow component, and a black component.

8. The method of claim 1, wherein the conversion process comprises a lookup table having entries associated with a plurality of color values in the source color space and a corresponding plurality of preferred color values in the destination color space.

9. The method of claim 1, wherein at least a portion of the plurality of preferred color values is generated based on a gray component replacement profile.

10. The method of claim 1, wherein at least a portion of the plurality of preferred color values is identified from an image file having a plurality of color values that share a gray component replacement profile.

11. A method comprising:
receiving, by operation of a computer, an input color value of a source color space for conversion to a destination color space, the destination color space having more color components than the source color space; and
converting, by operation of a computer, the input color value to a preferred color value in the destination color space using a conversion process for converting color values in the source color space to the destination color space, the conversion process determined by:
identifying a plurality of preferred color values in the destination color space, each of the plurality of preferred color values being one of a set of colorimetrically equivalent color values;
defining intermediate color values in an intermediate color space, the intermediate color values corresponding to the plurality of preferred color values, the intermediate color space having a number of color components that is equal to a number of color components of the source color space;
identifying a known mapping from the destination color space to the source color space, wherein the source color space differs from the intermediate color space; and
using the intermediate color values and the known mapping to determine the conversion process for converting color values in the source color space to color values in the destination color space.

12. The method of claim 11, wherein using the intermediate color values and the known mapping to determine the conversion process involves using a lookup table having entries associated with a plurality of the intermediate color values in the intermediate color space and a corresponding plurality of preferred color values in the destination color space.

13. The method of claim 12, wherein the corresponding plurality of preferred color values in the destination color space comprises a plurality of color values associated with primary colors, secondary colors, a substantially darkest neutral color, a substantially brightest neutral color, black start colors, and black maximum colors.

14. The method of claim 12, wherein the conversion process comprises the lookup table.

15. The method of claim 11, wherein the conversion process comprises a lookup table having entries associated with a plurality of color values in the source color space and a corresponding plurality of preferred color values in the destination color space.

16. The method of claim 11, wherein the source color space has three color components, the destination color space has four color components, and the intermediate color space has three color components.

17. The method of claim 11, wherein the destination color space includes cyan, magenta, yellow, and black color components, and wherein converting the input color value to a preferred destination color value using the intermediate color space comprises:
converting the input color value to a first destination color value using the intermediate color space, the destination color value having a black color component value that is not smoothed; and
determining a preferred color value by applying a smoothing function to the black component value to obtain a new black component value.

18. The method of claim 11, wherein before receiving the input color value, the input color value is determined from a color value in a color space having more color components than the source color space.

19. A computer program product, encoded on a non-transitory computer-readable medium, operable to cause data processing apparatus to perform operations comprising:
receiving an input color value of a source color space for conversion to a destination color space, the destination color space having more color components than the source color space, the destination color space having multiple sets of equivalent color values, each of the multiple sets having a preferred color value;
receiving a conversion process for converting color values in the source color space to the destination color space, the conversion process determined by:
identifying a plurality of preferred color values in the destination color space, each of the plurality of preferred color values being one of a set of colorimetrically equivalent color values;
defining intermediate color values in an intermediate color space, the intermediate color values corresponding to the plurality of preferred color values, the intermediate color space having a number of color components that is equal to a number of color components of the source color space;
identifying a known mapping from the destination color space to the source color space, wherein the source color space differs from the intermediate color space; and
using the intermediate color values and the known mapping to determine the conversion process for converting color values in the source color space to color values in the destination color space; and
converting the input color value to a preferred color value in the destination color space using the conversion process.

20. The computer program product of claim 19, wherein using the intermediate color values and the known mapping to determine the conversion process involves using a lookup table having entries associated with a plurality of the intermediate color values in the intermediate color space and a corresponding plurality of preferred color values in the destination color space.

21. The computer program product of claim 19, wherein the corresponding plurality of preferred color values in the destination color space comprises a plurality of color values associated with primary colors, secondary colors, a substantially darkest neutral color, a substantially brightest neutral color, black start colors, and black maximum colors.

22. A system comprising:
a memory operable to store a first electronic document comprising a plurality of color values in a first color space and a second electronic document comprising a plurality of color values in a second color space; and
one or more processors communicatively coupled to the memory operable to perform operations comprising:
identifying a plurality of preferred color values in a destination color space, each preferred color value being one of a set of colorimetrically equivalent color values, the destination color space having color values defined by a particular number of color components;

defining intermediate color values in an intermediate color space, the intermediate color values corresponding to the plurality of preferred color values, the intermediate color space having a number of color components that is less than the particular number of color components of the destination color space;

identifying a known mapping from the destination color space to a source color space, wherein the source color space differs from the intermediate color space; and using the intermediate color values and the known mapping to determine a conversion process for converting source color values to preferred color values in the destination color space.

23. The system of claim 22, the operations further comprising converting a source color value in a source color space to a preferred color value in the destination color space using the conversion process, the source color space having the same number of components as the intermediate color space.

24. The system of claim 22, wherein the destination color space includes cyan, magenta, yellow, and black color components, and the conversion process comprises:

converting the source color value to a first destination color value using the intermediate color values, the first destination color value having a black color component value that is not smoothed; and determining a preferred color value by applying a smoothing function to the black component value to obtain a new black component value.

25. The system of claim 22, wherein the plurality of corresponding preferred color values in the destination color space comprises a plurality of color values associated with primary colors, secondary colors, a substantially darkest neutral color, a substantially brightest neutral color, black start colors, and black maximum colors.

* * * * *